(12) United States Patent (10) Patent No.: US 12,658,836 B2
Chen et al. (45) Date of Patent: Jun. 16, 2026

(54) LINEAR DRIVE, AND METHOD FOR CORRECTING SYSTEMATIC ERROR OF LINEAR DRIVE

(71) Applicant: NINGBO INSTITUTE OF MATERIALS TECHNOLOGY AND ENGINEERING, CHINESE ACADEMY OF SCIENCES, Ningbo (CN)

(72) Inventors: Qingying Chen, Ningbo (CN); Guilin Yang, Ningbo (CN); Junjie Dai, Ningbo (CN); Chi Zhang, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 156 days.

(21) Appl. No.: 18/542,609

(22) Filed: Dec. 16, 2023

(65) Prior Publication Data

US 2024/0136966 A1 Apr. 25, 2024

Related U.S. Application Data

(63) Continuation of application No. PCT/CN2021/125669, filed on Oct. 22, 2021.

(30) Foreign Application Priority Data

Jun. 25, 2021 (CN) .......................... 202110714156.6

(51) Int. Cl.
*H02P 25/06* (2016.01)
*G01L 5/00* (2006.01)
(Continued)

(52) U.S. Cl.
CPC ............ *H02P 25/06* (2013.01); *G01L 5/0061* (2013.01); *H02K 11/20* (2016.01); *H02K 41/02* (2013.01)

(58) Field of Classification Search
CPC .......... H02P 25/06; H02P 23/14; H02P 23/20; G01L 5/0061; H02K 11/20; H02K 41/02; G01P 15/09; G01P 15/12; G01P 15/125
See application file for complete search history.

(56) References Cited

U.S. PATENT DOCUMENTS 5,250,880 A 10/1993 Chesney et al.
6,408,045 B1 * 6/2002 Matsui ................... G03F 7/709
378/204

(Continued)

FOREIGN PATENT DOCUMENTS

CN 203133252 U 8/2013
CN 104678711 A 6/2015
(Continued)

OTHER PUBLICATIONS

International Search Report of PCT/CN2021/125669.
The First China Office Action of 202110714156.6.
The Second China Office Action of 202110714156.6.

*Primary Examiner* — Bickey Dhakal

(57) ABSTRACT

A linear drive and a method for correcting a systematic error of the linear drive are provided. The linear drive includes a fixed assembly, a movable assembly, a first force sensor and a second force sensor. The movable assembly is movably connected to one end of the fixed assembly, and the movable assembly capable of being movable in a direction towards or away from the fixed assembly. The first force sensor is disposed at one end of the fixed assembly away from the movable assembly and configured for detecting a force acting on the first force sensor from the fixed assembly towards the movable assembly. The second force sensor is (Continued)

disposed at one end of the movable assembly away from the fixed assembly and configured for detecting a force acting on the second force sensor from the movable assembly toward the fixed assembly.

14 Claims, 1 Drawing Sheet

(51) Int. Cl.
   *H02K 11/20*       (2016.01)
   *H02K 41/02*       (2006.01)

(56) References Cited

U.S. PATENT DOCUMENTS

| | | | |
|---|---|---|---|
| 2014/0197706 A1 | 7/2014 | Ahn et al. | |
| 2018/0188123 A1 | 7/2018 | Su et al. | |

FOREIGN PATENT DOCUMENTS

| | | | | |
|---|---|---|---|---|
| CN | 110160696 | A | 8/2019 | |
| CN | 111044196 | A | 4/2020 | |
| CN | 113484540 | A | 10/2021 | |
| JP | 2000077503 | A | 3/2000 | |
| WO | WO-8807438 | A1 * | 10/1988 | .......... B25J 15/0019 |

* cited by examiner

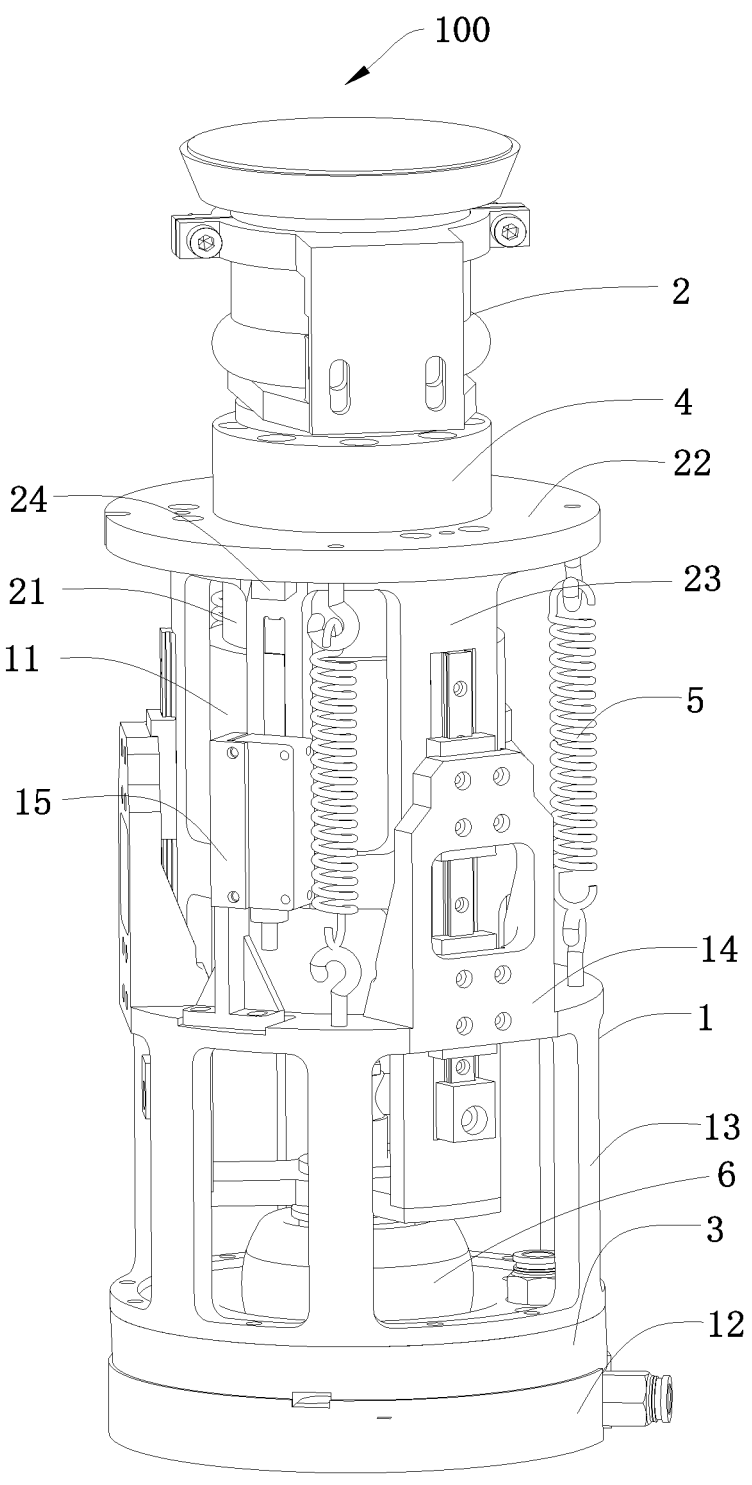

1

LINEAR DRIVE, AND METHOD FOR CORRECTING SYSTEMATIC ERROR OF LINEAR DRIVE

CROSS-REFERENCE TO RELATED APPLICATIONS

This application is a continuation of international patent application No. PCT/CN2021/125669, filed on Oct. 22, 2021, which itself claims priority to Chinese patent application No. 202110714156.6, filed on Jun. 25, 2021, and titled "LINEAR DRIVE, AND METHOD FOR CORRECTING SYSTEMATIC ERROR OF LINEAR DRIVE". The content of the above identified application is hereby incorporated herein in their entireties by reference.

TECHNICAL FIELD

The present disclosure relates to the field of driving devices, and in particular, to a linear drive, and a method for correcting systematic error of the linear drive.

BACKGROUND

A linear drive is widely used in a precision machine tool, a textile machinery and a packaging machinery. However, because there is a blocking force in a driving process of the linear drive, and the blocking force is easy to cause errors in a dynamic response process of the linear drive, it is difficult to accurately control a motion process of the linear drive.

SUMMARY

In view of above, it is necessary to provide a linear drive and a method for correcting systematic error of the linear drive, the method for correcting systematic error of the linear drive can correct an error existing in a dynamic response process of the linear drive.

The present disclosure provides a linear drive. The linear drive includes a fixed assembly, a movable assembly, a first force sensor and a second force sensor. The movable assembly is movably connected to one end of the fixed assembly and the movable assembly is capable of being movable in a direction towards or away from the fixed assembly. The first force sensor is disposed at one end of the fixed assembly away from the movable assembly and configured for detecting a force acting on the first force sensor from the fixed assembly towards the movable assembly. The second force sensor is disposed at one end of the movable assembly away from the fixed assembly and configured for detecting a force acting on the second force sensor from the movable assembly toward the fixed assembly.

In some embodiments, the fixed assembly includes a motor stator. The movable assembly includes a motorized motor. The motorized motor is movably coupled to the motor stator and the motor stator is capable of driving the motorized motor to move. The first force sensor is provided at an end of the motor stator away from the motorized motor, and the second force sensor is provided at an end of the motorized motor away from the motor stator. The motor stator can drive the motorized motor to move linearly in the direction towards or away from the motor stator, and the motor stator and the motorized motor have a high matching accuracy and a fast response speed, which increases a moving accuracy and response speed of the linear drive.

In some embodiments, the movable assembly further includes a movable platform. The movable platform is fixed to an end of the motorized motor away from the motor stator, and the second force sensor is disposed on a side of the movable platform away from the motor stator. The fixed assembly further includes a fixed platform and a support frame, the support frame is fixedly disposed at one end of the motor stator away from the motorized motor. The fixed platform is disposed at one end of the support frame away from the motor stator, and the first force sensor is disposed between the fixed platform and the support frame. In this way, the motorized motor and the second force sensor are installed on both sides of the movable platform, which can reduce an assembly difficulty of the movable assembly, thus improving a structural compactness of the movable assembly. And by providing the support frame, the motor stator and the first force sensor can be installed at both ends of the support frame, thereby reducing an assembly difficulty of the fixed assembly and improving a structural compactness of the fixed assembly. The fixed platform is arranged between the fixture and the first force sensor, which can avoid a damage of the first force sensor caused by the fixture directly squeezing the first force sensor.

In some embodiments, the support frame is provided with a first sliding member. The first sliding member is fixed on the support frame. The movable platform is provided with a second sliding member. The second sliding member is fixed on the movable platform. The first sliding member is slidably cooperated with the second sliding member. In this way, when the movable assembly moves towards or away from the fixed assembly, the first sliding member and the second sliding member can provide better guidance for the movable assembly, and avoiding a deviation of a moving direction of the movable assembly.

In some embodiments, the first sliding member is a slider, and the second sliding member is a slide rail movably cooperated with the slider. One end of the slide rail is fixedly connected to the movable platform, the other end of the slide rail passes through the support frame and extends toward the first force sensor. The linear drive further includes an airbag, the airbag is sandwiched between the slide rail and the support frame. A structure of the slide rail and the slider is relatively simple, which simplifies a structure of the linear drive and reducing a processing difficulty of the linear drive. The airbag is arranged between the slide rail and the support frame, which can make the airbag have a certain buffering effect on the slide rail, reduce the vibration generated when the movable assembly moves towards the fixed assembly, and help the linear drive to maintain stability during operation.

In some embodiments, the linear drive further includes a tension spring. One end of the tension spring is connected to the movable platform and the other end of the tension spring is connected to the support frame. The tension spring can pull the fixed assembly and the movable assembly in opposite directions, which is beneficial to improving of a system stiffness of the linear drive, so that the load force acting on the linear drive can be quickly transmitted to the first force sensor and the second force sensor, which is beneficial to improving of a response accuracy of the linear drive.

In some embodiments, the support frame is provided with a scale grating and the movable platform is provided with a grating reading head corresponding to the scale grating. Alternatively, the movable platform is provided with a scale grating and the support frame is provided with a grating reading head corresponding to the scale grating.

In some embodiments, the first force sensor is a strain-type force sensor, a capacitive force sensor, a piezoelectric force sensor or a piezo-resistive force sensor. The strain-type force sensor has a high sensitivity and stability. The capacitive force sensor has a characteristic of high dynamic response and can detect a change of output quickly and accurately. The piezoelectric force sensor has simple structure and high signal-to-noise ratio. A price of the piezo-resistive force sensor is low, which is beneficial to decrease of a manufacturing price of the linear drive.

In some embodiments, the second force sensor is a strain-type force sensor, a capacitive force sensor, a piezoelectric force sensor or a piezo-resistive force sensor. The strain-type force sensor has a high sensitivity and stability. The capacitive force sensor has a characteristic of high dynamic response and can detect a change of output quickly and accurately. The piezoelectric force sensor has simple structure and high signal-to-noise ratio. A price of the piezo-resistive force sensor is low, which is beneficial to decrease of a manufacturing price of the linear drive.

The present disclosure further provides a method for correcting a systematic error of a linear drive, which is configured for correcting a systematic error of the linear drive in any one of the above embodiments. The method for correcting a systematic error of a linear drive includes following steps: acting on the second force sensor and causing the movable assembly to move towards the fixed assembly by a load, and the fixed assembly abutting against a fixture, measuring a force $F_2$ of the load acting on the second force sensor via the second force sensor, measuring a reaction force $F_1$ of the fixed assembly from the fixture via the first force sensor, and correcting a systematic error of the linear drive by means of a formula: $F_2-F_1=M*a$, wherein M is a total mass of the movable assembly and the second force sensor, and a is an acceleration of the movable assembly and the second force sensor.

For the linear drive and the method for correcting systematic error of the linear drive in the present disclosure, the fixed assembly abuts against a fixture, a load acts on the second force sensor and causes the movable assembly to move towards the fixed assembly, and the load acts on the second force sensor is divided into two parts, one part of the load acting causes the second force sensor and the movable assembly to generate an acceleration a, and the other part of the load acting is transmitted to the fixed assembly and transmitted to a fixture through the fixed assembly. A force $F_2$ of the load acting on the second force sensor is measured via the second force sensor, a reaction force $F_1$ of the fixed assembly from the fixture is measured via the first force sensor. The magnitude of the force that causes the second force sensor and the movable assembly to generate the acceleration a can be calculated by means of a formula: $F_2-F_1=M*a$, wherein M is a total mass of the movable assembly and the second force sensor. In the related art, the force $F_2$ of the load acting on the second force sensor is generally regarded as a force that can make the power assembly generate the acceleration a. However, the force $F_2$ of the load acting on the second force sensor is not consistent with the actual force that causes the power assembly to generate the acceleration a, resulting in a systematic error. In the present disclosure, the reaction force $F_1$ is detected by the first force sensor, so that the actual force that causes the second force sensor and the movable assembly to generate acceleration a can be calculated, thus eliminating the systematic error. Therefore, the linear drive provided by the present disclosure can eliminates the systematic error existing in a dynamic response process of the linear drive, thus facilitating an accurate control of a motion process of the linear drive.

BRIEF DESCRIPTION OF THE DRAWINGS

FIG. 1 is a schematic view of a linear drive in an embodiment of the present disclosure.

Reference signs are as follows: 100 represents a linear drive; 1 represents a fixed assembly; 11 represents a motor stator; 12 represents a fixed platform; 13 represents a support frame; 14 represents a first sliding member; 15 represents a scale grating; 2 represents a movable assembly; 21 represents a motorized motor; 22 represents a movable platform; 23 represents a second sliding member; 24 represents a grating reading head; 3 represents a first force sensor; 4 represents a second force sensor; 5 represents a tension spring; and 6 represents an airbag.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is considered to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Referring to FIG. 1, the present disclosure provides a linear drive 100. The linear drive 100 includes a fixed assembly 1, a movable assembly 2, a first force sensor 3 and a second force sensor 4. Generally, when measuring a system error, the fixed assembly 1 abuts against a fixture, which can be an object such as a wall, a floor or a fixed bracket that will not move after being subjected to an external force. The movable assembly 2 is movably connected to one end of the fixed assembly 1 and the movable assembly 2 is capable of being movable in a direction towards or away from the fixed assembly 1. The movable assembly 2 can be driven by the fixed assembly 1 to move in a direction towards or away from the fixed assembly 1. Alternatively, the movable assembly 2 can be moved in a direction towards or away from the fixed assembly 1 under the action of a load.

The first force sensor 3 is disposed at one end of the fixed assembly 1 away from the movable assembly 2 and configured for detecting a force acting on the first force sensor 3 from the fixed assembly 1 towards the movable assembly 2. And the direction of the force is from the fixed assembly 1 toward the movable assembly 2, and the force acting on the first force sensor 3 can be measured by the first force sensor 3.

The second force sensor 4 is disposed at one end of the movable assembly 2 away from the fixed assembly 1 and configured for detecting a force acting on the second force sensor 4 from the movable assembly 2. And a direction of the force is from the movable assembly 2 toward the fixed assembly 1, and the force acting on the second force sensor 4 can be measured by the second force sensor 4.

Specifically, a load acts on the second force sensor 4, causing the movable assembly 2 to move towards the fixed assembly 1, and the load acting on the second force sensor 4 is divided into two parts. One part of the load acting causes the second force sensor 4 and the movable assembly 2 to generate an acceleration a, and the other part of the load acting is transmitted to the fixed assembly 1 and transmitted to a fixture through the fixed assembly 1. A force $F_2$ of the load acting on the second force sensor 4 is measured via the second force sensor 4. A reaction force $F_1$ of the fixed assembly 1 from the fixture is measured via the first force sensor 3. The magnitude of the force that causes the second force sensor and the movable assembly 2 to generate the acceleration a can be calculated by means of a formula: $F_2-F_1=M*a$, wherein M is a total mass of the movable assembly and the second force sensor.

In the related art, the force $F_2$ of the load acting on the second force sensor 4 is generally regarded as a force that can make the power assembly generate an acceleration a. However, the force $F_2$ of the load acting on the second force sensor 4 is not consistent with the actual force that causes the power assembly to generate the acceleration a, resulting in a systematic error.

In the present disclosure, the reaction force $F_1$ is detected by the first force sensor 3, so that the actual force that causes the second force sensor 4 and the movable assembly 2 to generate acceleration a can be calculated, thus eliminating the systematic error.

To sum up, the linear drive 100 provided by the present disclosure can eliminate the systematic error existing in a dynamic response process of the linear drive 100, thus facilitating an accurate control of a motion process of the linear drive 100.

In an embodiment, referring to FIG. 1, the fixed assembly 1 includes a motor stator 11. The movable assembly 2 includes a motorized motor 21. The motorized motor 21 is movably coupled to the motor stator 11 and the motor stator 11 is capable of driving the motorized motor 21 to move. The first force sensor 3 is provided at an end of the motor stator 11 away from the motorized motor 21, and the second force sensor 4 is provided at an end of the motorized motor 21 away from the motor stator 11. The motor stator 11 can drive the motorized motor 21 to move linearly in the direction towards or away from the motor stator 11, and the motor stator 11 and the motorized motor 21 have a high matching accuracy and a fast response speed, which is beneficial to improving of a moving accuracy and the response speed of the linear drive.

Furthermore, referring to FIG. 1, the movable assembly 2 further includes a movable platform 22. The movable platform 22 is fixed to an end of the motorized motor 21 away from the motor stator 11, and the second force sensor 4 is disposed on a side of the movable platform 22 away from the motor stator 11. In this way, the motorized motor 21 and the second force sensor 4 are installed on both sides of the movable platform 22, which can reduce an assembly difficulty of the movable assembly 2, thus improving a structural compactness of the movable assembly 2. The fixed assembly 1 further includes a fixed platform 12 and a support frame 13, the support frame 13 is fixedly disposed at one end of the motor stator 11 away from the motorized motor 21, the fixed platform 12 is disposed at one end of the support frame 13 away from the motor stator 11, and the first force sensor 3 is disposed between the fixed platform 12 and the support frame 13. Similarly, by providing the support frame 13, the motor stator 11 and the first force sensor 3 can be installed at both ends of the support frame 13, thereby reducing an assembly difficulty of the fixed assembly 1 and improving a structural compactness of the fixed assembly 1. The fixed platform 12 is arranged between the fixture and the first force sensor 3, which can avoid a damage of the first force sensor 3 caused by the fixture directly squeezing the first force sensor 3.

Referring to FIG. 1, the movable platform 22 is in a disc shape, and the motorized motor 21 and the second force sensor 4 are detachably connected to both sides of the movable platform 22 by fasteners. In this way, an assembly flexibility of the movable assembly 2 is improved, and a disassembly and an assembly of the linear drive 100 are facilitated. The support frame 13 is hollowed or a hollowed structure with a plurality of through holes located on a side wall thereof, which is beneficial to reducing a weight and a manufacturing price of the linear drive 100. In addition, the motor stator 11 and the first force sensor 3 are detachably connected to both sides of the support frame 13 by the fasteners, which can improve an assembly flexibility of the fixed assembly 1 and facilitate the disassembly and the assembly of the linear drive 100.

It can be understood that, "the first force sensor 3 is disposed between the fixed platform 12 and the support frame 13" means that the first force sensor 3 is arranged between the fixed platform 12 and the support frame 13. And both ends of the first force sensor 3 are in contact with the fixed platform 12 and the support frame 13 respectively, so that there is no direct contact between the fixed platform 12 and the support frame 13. Moreover, neither the fixed platform 12 nor the support frame 13 has a squeezing effect on the first force sensor 3, that is, the force on the first force sensor 3 is zero. In an actual assembly process of the fixed assembly 1, if the fixed platform 12 and the support frame 13 slightly squeeze the first force sensor 3, at this time, the first force sensor 3 can be calibrated, furthermore, when the linear drive 100 is not affected by the load, the force displayed by the first force sensor 3 is zero.

In an embodiment, referring to FIG. 1, the support frame 13 is provided with a first sliding member 14. The first sliding member 14 is fixed on the support frame 13. The movable platform 22 is provided with a second sliding member 23. The second sliding member 23 is fixed on the movable platform 22. The first sliding member 14 is slidably cooperated with the second sliding member 23. In this way, when the movable assembly 2 moves towards or away from the fixed assembly 1, the first sliding member 14 and the second sliding member 23 can provide better guidance for the movable assembly 2, and avoiding a deviation of a moving direction of the movable assembly 2. Furthermore, the first sliding member 14 is a slider, and the second sliding member 23 is a slide rail movably cooperated with the slider. One end of the slide rail is fixedly connected to the movable platform 22, and the other end of the slide rail passes through the support frame 13 and extends toward the first force sensor 3. The linear drive 100 further includes an airbag 6, and the airbag 6 is sandwiched between the slide rail and the support frame 13. A structure of the slide rail and the slider is relatively simple, which is beneficial to simplifying of a structure of the linear drive 100 and decrease of a processing difficulty of the linear drive 100. The airbag 6 is arranged between the slide rail and the support frame 13, which can make the airbag 6 have a certain buffering effect on the slide rail, reduce the vibration generated when the movable assembly 2 moves towards the fixed assembly 1, and help the linear drive 100 to maintain stability during operation. But it is not limited to this, in other embodiment, the first sliding member 14 can be a slide rail, and the second sliding member 23 is a slider movably cooperated with the slide rail.

Furthermore, referring to FIG. 1, the movable platform 22 is in a circular plate shape, and the linear drive is provided with a plurality of slide rails, and the plurality of slide rails are evenly distributed along a circumferential direction of the movable platform 22. Similarly, a plurality of sliders are evenly distributed along a circumferential direction of the support frame 13. In this way, it is beneficial to further enhancing the guiding role of the first sliding member 14 and the second sliding member 23.

In an embodiment, referring to FIG. 1, the linear drive 100 further includes a tension spring 5. One end of the tension spring 5 is connected to the movable platform 22 and the other end of the tension spring 5 is connected to the support frame 13. The tension spring 5 can pull the fixed assembly 1 and the movable assembly 2 in opposite directions, which is beneficial to increase of a system stiffness of the linear drive 100, so that the load force acting on the linear drive 100 can be quickly transmitted to the first force sensor 3 and the second force sensor 4, which is beneficial to increase of a response accuracy of the linear drive 100. Furthermore, the movable platform 22 is in a circular plate shape. A plurality of the tension springs 5 are provided and evenly distributed along a circumferential direction of the movable platform 22. In this way, a pulling force of the tension spring 5 on the whole linear drive 100 can be more uniform, and it can be assured a use of the linear drive 100 prevented from being influenced by a deformation under an uneven stress.

In an embodiment, referring to FIG. 1, the support frame 13 is provided with a scale grating 15 and the movable platform 22 is provided with a grating reading head 24 corresponding to the scale grating 15. In this way, a moving distance d of the movable assembly 2 relative to the fixed assembly 1 can be accurately measured, and according to a formula of Hooke law: $F_K=K*d$, wherein $F_K$ is an elastic effect of the tension spring 5 and K is an elastic coefficient of the tension spring 5. It can be seen from the above formula that a change of elastic force of the tension spring 5 is beneficial for the linear drive 100 to adjust the tension spring 5 according to the change of elastic force of the tension spring 5. But it is not limited to this, in another embodiment, the movable platform 22 is provided with a scale grating 15 and the support frame 13 is provided with a grating reading head 24 corresponding to the scale grating 15.

The first force sensor 3 is a strain-type force sensor, a capacitive force sensor, a piezoelectric force sensor or a piezo-resistive force sensor. Similarly, the second force sensor 4 is a strain-type force sensor, a capacitive force sensor, a piezoelectric force sensor or a piezo-resistive force sensor. Both the first force sensor 3 and the second force sensor 4 have a characteristic of high dynamic response. The strain-type force sensor has high sensitivity and stability. The capacitive force sensor has a characteristic of a high dynamic response and can detect a change of output quickly and accurately. The piezoelectric force sensor has a simple structure and a high signal-to-noise ratio. The price of the piezo-resistive force sensor is low, which is beneficial to decrease of the manufacturing price of the linear drive 100.

The present disclosure further provides a method for correcting a systematic error of a linear drive, which is configured for correcting a systematic error of the linear drive in any one of the above embodiments. The method for correcting a systematic error of a linear drive including following steps: acting on the second force sensor 4 and causing the movable assembly 2 to move towards the fixed assembly 1 by a load, and the fixed assembly 1 abutting against a fixture, measuring a force $F_2$ of the load acting on the second force sensor via the second force sensor, measuring a reaction force $F_1$ of the fixed assembly from the fixture via the first force sensor; and correcting a systematic error of the linear drive by means of a formula: $F_2-F_1=M*a$, wherein M is a total mass of the movable assembly 2 and the second force sensor 4, and a is an acceleration of the movable assembly 2 and the second force sensor 4. Generally, the reaction force $F_1$ and the force $F_2$ are input into a processor (the processor generally uses a computer). And the processor obtains an accurate inertial force of $F_2-F_1$ by means of a formula: $F_2-F_1=M*a$, so as to correct a systematic error of the linear drive 100. The force difference between $F_2$ and $F_1$ is the actual force that causes the second force sensor 4 and the movable assembly 2 to generate the acceleration a.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A linear drive, comprising:
   a fixed assembly;
   a movable assembly, movably connected to one end of the fixed assembly and the movable assembly capable of being movable in a direction towards or away from the fixed assembly;
   a first force sensor, disposed at one end of the fixed assembly away from the movable assembly and configured for detecting a force acting on the first force sensor from the fixed assembly towards the movable assembly; and
   a second force sensor, disposed at one end of the movable assembly away from the fixed assembly and configured for detecting a force acting on the second force sensor from the movable assembly toward the fixed assembly;
   the fixed assembly comprises a motor stator, the movable assembly comprises a motorized motor, and the motorized motor is movably coupled to the motor stator and the motor stator being capable of driving the motorized motor to move;
   the first force sensor is provided at an end of the motor stator away from the motorized motor, and the second force sensor is provided at an end of the motorized motor away from the motor stator;
   the movable assembly further comprises a movable platform, the movable platform is fixed to an end of the motorized motor away from the motor stator, and the second force sensor is disposed on a side of the movable platform away from the motor stator; and the fixed assembly further comprises a fixed platform and a support frame, the support frame is fixedly disposed at one end of the motor stator away from the motorized motor, the fixed platform is disposed at one end of the support frame away from the motor stator, and the first force sensor is disposed between the fixed platform and the support frame.

2. The linear drive of claim 1, wherein the support frame is provided with a first sliding member, the first sliding member is fixed on the support frame, the movable platform is provided with a second sliding member, the second sliding member is fixed on the movable platform, and the first sliding member is slidably cooperated with the second sliding member.

3. The linear drive of claim 2, wherein the first sliding member is a slider, the second sliding member is a slide rail movably cooperated with the slider, one end of the slide rail is fixedly connected to the movable platform, the other end of the slide rail passes through the support frame and extends toward the first force sensor, the linear drive further comprises an airbag, the airbag is sandwiched between the slide rail and the support frame.

4. The linear drive of claim 1, further comprising a tension spring, wherein one end of the tension spring is connected to the movable platform and the other end of the tension spring is connected to the support frame.

5. The linear drive of claim 1, wherein the support frame is provided with a scale grating and the movable platform is provided with a grating reading head corresponding to the scale grating; or, the movable platform is provided with a scale grating and the support frame is provided with a grating reading head corresponding to the scale grating.

6. The linear drive of claim 1, wherein the first force sensor is a strain-type force sensor, a capacitive force sensor, a piezoelectric force sensor or a piezo-resistive force sensor.

7. The linear drive of claim 1, wherein the second force sensor is a strain-type force sensor, a capacitive force sensor, a piezoelectric force sensor or a piezo-resistive force sensor.

8. A method for correcting a systematic error of a linear drive, configured for correcting the systematic error of the linear drive of claim 1 and comprising following steps:

acting on the second force sensor and causing the movable assembly to move towards the fixed assembly by a load, and the fixed assembly abutting against a fixture, measuring a force $F_2$ of the load acting on the second force sensor via the second force sensor, measuring a reaction force $F_1$ of the fixed assembly from the fixture via the first force sensor, and correcting a systematic error of the linear drive by means of a formula: $F_2 - F_1 = M*a$, wherein M is a total mass of the movable assembly and the second force sensor, and a is an acceleration of the movable assembly and the second force sensor.

9. The method of claim 8, wherein the support frame is provided with a first sliding member, the first sliding member is fixed on the support frame, the movable platform is provided with a second sliding member, the second sliding member is fixed on the movable platform, and the first sliding member is slidably cooperated with the second sliding member.

10. The method of claim 9, wherein the first sliding member is a slider, the second sliding member is a slide rail movably cooperated with the slider, one end of the slide rail is fixedly connected to the movable platform, the other end of the slide rail passes through the support frame and extends toward the first force sensor, the linear drive further comprises an airbag, the airbag is sandwiched between the slide rail and the support frame.

11. The method of claim 8, further comprising a tension spring, wherein one end of the tension spring is connected to the movable platform and the other end of the tension spring is connected to the support frame.

12. The method of claim 8, wherein the support frame is provided with a scale grating and the movable platform is provided with a grating reading head corresponding to the scale grating; or, the movable platform is provided with a scale grating and the support frame is provided with a grating reading head corresponding to the scale grating.

13. The method of claim 8, wherein the first force sensor is a strain-type force sensor, a capacitive force sensor, a piezoelectric force sensor or a piezo-resistive force sensor.

14. The method of claim 8, wherein the second force sensor is a strain-type force sensor, a capacitive force sensor, a piezoelectric force sensor or a piezo-resistive force sensor.

* * * * *